G. M. IRWIN.
TOILET ARTICLE.
APPLICATION FILED AUG. 24, 1908.
918,053. Patented Apr. 13, 1909.
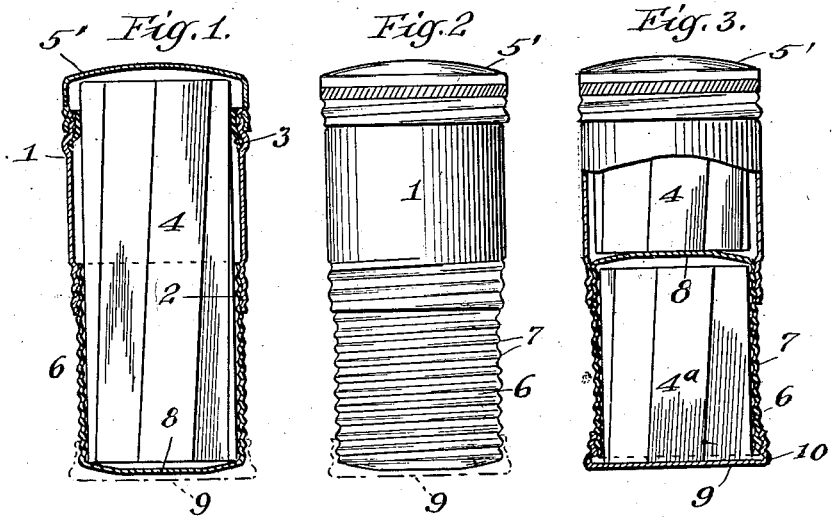
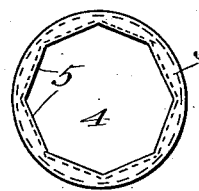
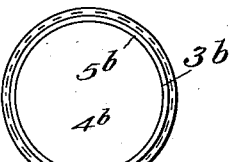
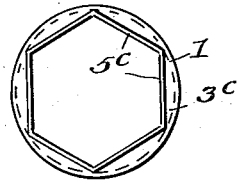
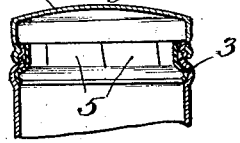
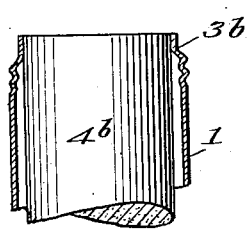
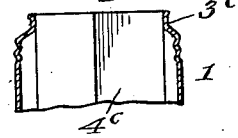
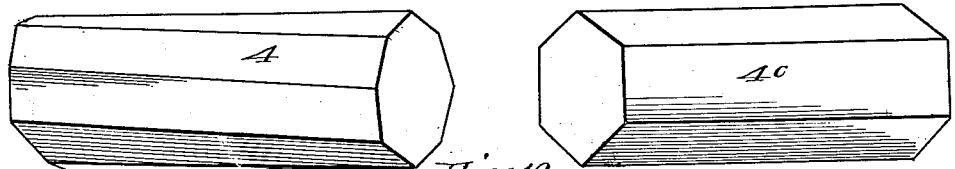
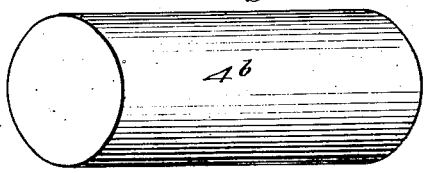
WITNESSES
INVENTOR
Geo. M. Irwin
BY
ATTORNEY

UNITED STATES PATENT OFFICE.

GEORGE M. IRWIN, OF EAST ORANGE, NEW JERSEY.

TOILET ARTICLE.

No. 918,053.    Specification of Letters Patent.    Patented April 13, 1909.

Application filed August 24, 1908. Serial No. 450,072.

*To all whom it may concern:*

Be it known that I, GEORGE M. IRWIN, a citizen of the United States, and a resident of the city of East Orange, county of Essex, and State of New Jersey, have invented certain new and useful Improvements in Toilet Articles, as set forth in the following specification.

This invention relates to extruding holders for stick substance such as sticks of shaving soap, sticks of other toilet substances, or sticks of any abradable substance capable integrally of retaining a stick form. The word "extrude" and its derivatives, as used in this specification, designate the forcible ejecting through a close fitting mouth of a stick of substance which is not plastic and which is not caused to change its form.

An object of the invention is to provide an extruding holder for stick substance as described, in which substantially the entire longitudinal length is serviceable for containing the stick substance; in which a stick of substance, as described, may protrude from a close fitting mouth at the top of a top tubular shell and extending down to a bottom cross closure in a bottom tubular shell interiorly telescoping with the top shell; in which the bottom tubular shell is reversible and telescopes either end first into said top shell, whereby a reversal of the bottom shell will effect substantially the complete extrusion of the stick of substance described.

A further object of the invention is to provide for the ready extrusion of a prismatic stick of substance as described having a polygonal cross section. It is to be understood that "polygonal", as used herein, is not limited to a figure bounded solely by straight lines such as hexagon or octagon which are illustrated. The term is used to distinguish from circular and contemplates all figures falling under this definition. It is, of course, to be understood that the term refers to a figure the angular direction of whose outline does not vary uniformly, as in the case of a circle. To accomplish this object the combination of an extruding holder having an extruding mouth of polygonal cross section corresponding to that of the stick to be extruded and having an extruding member which telescopes with a rotary motion, all in combination with such a prismatic stick of substance having a twist in such a direction that the rotating advance of the extruding member will simultaneously operate to push and screw the twisted prismatic stick through and out of the polygonal mouth.

Further objects of the invention are to improve in general the construction of an article of the class described and further objects will be apparent from the following description and from the accompanying claims, which should be read in connection with the accompanying drawings, which form part of this application, in which like characters designate corresponding parts, and in which—

Figure 1 is a vertical section of the holder containing a twisted prismatic stick having an octagonal cross section; Fig. 2 is a vertical elevation of the holder shown in Fig. 1; Fig. 3 is a vertical elevation partly in section of the same holder showing the stick of Fig. 1 half consumed and the bottom shell reversed and containing a reserve charge of one-half a stick; Fig. 4 is a top plan view of the construction shown in Fig. 1 with the cap removed; Fig. 5 is a view similar to Fig. 4 showing a holder providing a circular mouth; Fig. 6 is a sectional elevation, with parts broken away, of the construction shown in Fig. 5; Fig. 7 is a view similar to Fig. 5 showing the device having a hexagonal mouth; Fig. 8 is a view similar to Fig. 6 showing the construction of Fig. 7; Fig. 9 is a vertical section through the top of the holder shown in Fig. 1 with the stick removed; Fig. 10 is a perspective view of a twisted prismatic stick of soap having uniform octagonal cross section; Fig. 11 is a perspective view of a right prismatic stick of soap having uniformal hexagonal cross section; and Fig. 12 is a perspective view of a cylindrical stick of soap.

In the construction shown, 1 designates the top tubular shell shown cylindrical and provided with interior screw threads 2 at its bottom end. The top end is provided with a throat 3 having a restricted mouth through which the stick of substance 4 projects and which fits snugly about the stick of substance corresponding in cross section thereto. The construction shown in Figs. 1, 2, 3, 4 and 9 provides a mouth octagonal in cross section the sides of which are indicated by 5. In this construction the throat 3 is shown as a piece separate from the shell 1 and suitably secured to the shell 1, in any well known manner, although it is not necessary that the throat be formed separately as will hereinafter appear.

A protecting cap 5' is provided which may be screw threaded as indicated and screwed home upon the shell 1 over the projecting end of the stick of soap 4.

The bottom shell is indicated by 6 and is shown tubular and cylindrical and provided throughout its longitudinal extent with exterior screw threads 7 which screw into the screw threads 2 of the top shell and with threads 2 and 7 constitute means for holding the shells together. A cross closure 8 is formed at one end of the bottom shell 6 but does not project outwardly beyond the screw threads 7 so that the bottom shell 6 is reversible and is capable of interiorly telescoping, either end first, into the top shell. In Fig. 1 the bottom shell is telescoping into the top shell in such a manner that the cross closure 8 is at the bottom of the holder and substantially the entire longitudinal length of the holder provides a packing space for containing the stick of soap. In Fig. 3 the bottom shell 6 has been reversed and the stick of soap 4 has been half consumed so that the cross closure 8 has been reversed into position to extrude the remainder of the stick 4 while a reserve charge of soap shown in the form of a half stick $4^a$ is stored within the bottom shell 6 and held in place by a cap 9 which is threaded to screw on to the threads 7 and may be knurled along its edge 10 to form a ready grip for manual manipulation of the shell. Cap 9 is shown also in dotted lines in Figs. 1 and 2 where it serves only as means for effecting the rotation of the bottom shell 6 while in Fig. 3 it serves also as a second closure for the bottom shell 6.

In Figs. 5 and 6 the top shell 1 is shown modified to contain a cylindrical stick of soap $4^b$ in which case the throat $3^b$ provides a circular opening $5^b$ for the cylindrical stick $4^b$.

The top shell 1 may be modified, as shown in Figs. 7 and 8, to contain the hexagonal stick of soap $4^c$ in which case a throat $3^c$ is provided having a hexagonal mouth, the walls of which are indicated by $5^c$.

In use the holder may be filled with a twisted prismatic stick of soap of uniform polygonal cross section and as shown in Fig. 1. The cap 5' is then removed when the exposed end of the stick 4 may be rubbed across the face in the usual manner preparatory to shaving. A sufficient quantity of the soap is abraded and distributed in the usual manner while all of the stick except the exposed end is protected from moisture and, being contained in a clean holder, is cleanly and convenient for handling. When the cap 5' is applied the stick is ready packed for traveling. Thus the holder constitutes virtually a traveling container as well as a holder for actual use. When it is desired that more soap be extruded through the mouth of the holder the shell 1 is held against turning and a rotary motion in a right handed direction is imparted to the bottom shell, by grasping the cap 9 and turning it. The cross closure 8 serves as an extruding member and as it advances upwardly imparts a push to the stick 4 and at the same time a tendency to rotate. The result is that the stick 4 is pushed and screwed out of the polygonal mouth 5 at the same time.

It is, of course, to be understood that the device may be used for other than twisted prismatic sticks as for instance a right prismatic stick as shown in Figs. 7, 8 and 11. However, with such a stick, the rotation of the extruding member which imparts a tendency to turn to the stick $4^c$ tends to wedge the stick in the polygonal mouth $5^c$. This is entirely eliminated by the twisted prismatic stick 4. In the case of the cylindrical stick $4^b$ a tendency to turn or an actual turning of the stick $4^b$ relatively to the mouth $5^b$ is more or less immaterial. It is, however, advantageous in many instances to provide sticks of shaving soap of a polygonal cross section designed to fit only one particular holder. Thus it is apparent that such a combination of stick and holder should be provided as to insure a proper extrusion of the stick. This applicant has accomplished, by the combination shown with a twisted prismatic stick of polygonal cross section. The twist of the stick in effect produces the equivalent of screw threads on the stick of soap which should be in the direction of the threads 7 of the bottom shell 6 but the twist may be gentle so that many rotations of the bottom shell 6 would be required to produce one rotation or fraction of a rotation of the stick. This, of course, occasions slipping between the bottom end of the stick 4 and the extruding member 8 which is not at all objectionable.

It is, of course, to be understood that what has been shown and described is merely for purposes of illustration and that all modifications within the scope of the accompanying claims are contemplated.

What is claimed and what is desired to be secured by United States Letters Patent is:—

1. An extruding holder for stick substance as described comprising, a top tubular shell; a reversible bottom tubular shell having one open end and a cross closure at one end and capable of interiorly telescoping either end first, into said top shell; means provided on said shells for holding them together in telescoping relation; a restricted collar for the top end of said top shell providing a large open mouth with its maximum diameter approximating the interior diameter of said bottom shell; and a removable closure for the open end of said bottom shell, having provisions for attachment to either end of said bottom shell, and having provisions for manual engagement to manipulate said bottom shell to extrude said stick substance in a solid body through the restricted collar of said top shell.

2. In combination, an extruding holder for stick substance as described comprising, a top tubular cylindrical shell having interior screw threads formed at its lower end; a reversible bottom tubular cylindrical shell having a cross closure at one end and having exterior screw threads extending over its longitudinal extent and interiorly threading telescopically, into said top shell; a restricted collar for the top end of said top shell providing a large open mouth with its maximum diameter approximating the interior diameter of said bottom shell; and a solid stick of said substance fitting snugly into said restricted collar and protruding out through the same, of a cross section substantially to fill said bottom shell, and in coöperative relation with said cross closure of the bottom shell to be extruded through said restricted collar upon the turning of said bottom shell.

3. An extruding holder for stick substance as described comprising, a top tubular cylindrical shell having interior screw threads formed at its lower end; a reversible bottom tubular cylindrical shell having a cross closure at one end and having exterior screw threads extending over its entire longitudinal extent and interiorly threading telescopically, either end first, into said top shell; a cap threaded to fit over either end of said bottom shell and serviceable as gripping means for rotating said bottom shell; and a restricted collar for the top end of said top shell providing a large open mouth with its maximum diameter approximating the interior diameter of said bottom shell.

4. An extruding holder for stick substance as described, comprising a top tubular shell having a collar at its top providing an extruding mouth polygonal in cross section and having internal screw threads at its bottom end; and an extruding member having external screw threads and screwing interiorly into said top shell, in combination with a twisted prismatic stick of substance as described corresponding in cross section to that of said mouth and with the direction of its twist corresponding to that of the said external screw threads, whereby the rotation of said extruding member will both push and screw said stick through said polygonal mouth.

In testimony whereof, I have signed my name to this specification, in the presence of two subscribing witnesses.

GEORGE M. IRWIN.

Witnesses:
GEORGE A. VOSS,
M. T. O'BRIEN.